KEYED AUTOMATIC GAIN CONTROL

Filed July 7, 1948

2 SHEETS--SHEET 1

INVENTOR
Karl R. Wendt
BY Olin J. Mitchell
ATTORNEY

May 5, 1953 K. R. WENDT 2,637,772

KEYED AUTOMATIC GAIN CONTROL

Filed July 7, 1948 2 SHEETS—SHEET 2

INVENTOR
Karl R. Wendt
BY Olin V. Mitchell
ATTORNEY

UNITED STATES PATENT OFFICE 2,637,772

KEYED AUTOMATIC GAIN CONTROL

Karl R. Wendt, Hightstown, N. J., assignor to Radio Corporation of America, a corporation of Delaware Application July 7, 1948, Serial No. 37,434

1 Claim. (Cl. 178—7.3)

This invention relates to automatic gain control systems for use in radio receivers adapted to receive image signals having sync and blank out information included therein and more particularly for use in present day television receiver systems.

The present invention deals more particularly with a novel form of automatic gain control for television receivers and operates to control the degree of amplification of the video signals afforded by the television receivers in accordance with the intensity of the radio carrier received during the sync or blanking intervals only. The novel automatic gain control system of this invention is substantially free from the effects of noise even when the receiver is operated in areas where the noise level is extremely high. By means of the present invention satisfactory operation of the receiver can be obtained without loss of video signal strength at the image receiving tube and without the possibility of the receiver circuit being biased beyond cut off or blocked because of strong surges of automatic gain control potentials as may be experienced in the operation of certain other circuits providing automatic gain control action.

It is commonly known that automatic gain control circuits for use in television receiving equipment differ greatly from the more frequently encountered automatic gain control circuits embodied in receivers for sound broadcast signals. In the instance of the usual broadcast receiver for receiving amplitude modulated carriers, it is considered adequate that the automatic gain control potential be produced by electrical information gleaned from the average carrier intensity of the received radio signal. Such an automatic gain control circuit would not, however, be satisfactory for controlling the gain of television receiver video channels as the average signal strength of the radio frequency carrier is a function of the average image or picture brilliance sometimes referred to as "background level." Development of an automatic gain control voltage in accordance with the average signal strength of the received radio carrier would cause the gain to be altered not only in accordance with signal intensity variations of the received radio carrier due to undesirable fading or other atmospheric phenomenon, but also in accordance with average picture brilliance of the image being transmitted.

Radio transmitted "negative modulated" television signals normally include blanking pulses or black level information which data is transmitted between each image line in combination with the line synchronizing pulse. This line sync pulse is most commonly superimposed upon the black level signal and these data are transmitted at some respectively predetermined constant but different carrier levels. In common television practice the sync pulse is transmitted at practically full carrier intensity, or 100 percent carrier amplitude, while the black level or blank out pulse is transmitted at approximately 75 percent of the full carrier amplitude. The blanking impulse or black level signal in accordance with R. M. A. television synchronizing waveform standards is of the order of 16 to 18 percent of a line interval with the sync impulse having a period of approximately 8 percent of a line interval. Sync impulses when superimposed upon the blanking or black level signals are stationed between the extremities of the blanking interval so as to form what is commonly termed a "front porch" and a "back porch" on the pedestal-like structure formed by the combined sync signal and blank out impulse. The front porch interval is approximately 2 percent of the line interval and represents the time between the leading edge of each black level signal and the leading edge of the line sync pulse, whereas, the back porch interval of approximately 8 percent of a line interval, is equivalent to the time interval between the end of the line sync pulse and the termination of the black level or blank out signal.

The amplitude of the radio frequency carrier as previously brought out is held constant during the transmission of all blanking and sync impulse information. During the transmission of the image intelligence of the television signal, that is during each line interval between successive blanking signals, the average amplitude of the transmitted radio frequency carrier is a function of the average light contained in the television image. Accordingly if the reproduced image is to be predominantly dark the average carrier amplitude will necessarily be greater than would be the case if the background level of the image were considerably lighter, such action of course is true only of the negative system of transmission wherein white picture information is transmitted at a lower carrier level than black level information. It is expedient, in order that the control of the gain of the receiver be in accordance with the proper aspects of the carrier, that the automatic gain control potential be developed such that its magnitude is a function of the intensity of the received carrier of the television signal during the blanking or sync intervals only and as hereinbefore brought out, not during the transmission of the picture or line information.

Since, the blanking and more particularly the sync signals are transmitted at greater radio frequency intensity than image line information, it has been the general practice in television receivers to utilize some form of a peak rectifier which responds to those peak pulses of energy represented by the blanking and synchronizing signals during the synchronizing intervals. By this means there is then developed an automatic gain control potential for desirably altering the gain of the video channel in accordance with the peak signal strength received during the synchronizing intervals. An automatic gain control system of this type is satisfactory to a degree so long as extraneous signals are not received in sufficient intensity to cause the peak rectifier to respond to this undesirable signal energy. In such an arrangement if there is considerable noise picked up at the receiver the noise signal, as such, especially if it has an amplitude in excess of the received carrier during the synchronizing intervals, will cause the peak detector to produce an abnormal increase in rectified energy and therefore produce abnormal increase in automatic gain control potential which results in a generally undesirable reduction of the receiver sensitivity as a result of such noise. This of course interferes with the proper operation of the receiver and produces fluctuations of the reproduced image brightness with possible periods following the noise bursts during which inadequate synchronizing information is applied to the synchronizing circuits. This latter effect, to be later discussed, tends to produce "tearing out" or other destructive disturbances in the reproduced image. Furthermore in such systems the automatic gain control potential that is developed by each successive sync or blanking signal is generally stored on a condenser or applied to a circuit having a time constant where delay action obtains such that the automatic gain control potential, can for all practical purposes, be maintained constant throughout one or more succeeding line intervals. Due to the presence of this time delay circuit such a circuit responds rapidly to high intensity noise pulses but does not allow the receiver to recover as quickly from the effects of noise as it responds to the noise, with the result that proper gain of the video channel is not re-established until after an interval corresponding to several image lines has elapsed.

In the presence of considerable noise such automatic gain control circuits are not therefore entirely satisfactory since they respond to noise pulses as well as sync impulses and in so doing are slow to recover from increased energy effects represented by the additional noise.

The present invention overcomes the above disadvantages by means of a simple arrangement which under the influence of keying pulses permits development of an automatic gain control potential only during blanking intervals so that the automatic gain control circuit is in turn responsive only to the signal strength of the received signal during these blanking intervals and does not in any way respond to noise pulses that may occur between the transmission of said blanking signals. This keyed action preferably is timed to occur during the back porch level of the blanking signal such that A. G. C. voltage will be developed on a base divorced from actual synchronizing information and it is therefore not influenced by variations thereof. This feature alone is of considerable value since the interval during which the automatic gain control circuit is effective to respond to the received signal strength is only of the order of 5 percent of the time so that during 95 percent of the time the automatic gain control circuit is ineffective and wholly unresponsive to any received signals.

Accordingly, the present invention due to the above described keying action will display, ideally, 20 times the noise immunity possible in unkeyed gain control circuits. This increase of 20 times the noise immunity, however, may not be fully realized in practical applications due to several minor factors which will become apparent as the specification proceeds.

The present invention, in addition to providing absolute noise immunity during 95 percent of the line interval, is also in part immune to noise which may occur during the approximate 5 percent of time during which the automatic gain controlling circuit is keyed into response to the received signal. In the present system if a noise impulse should be received during the 5 percent interval, the circuit is so arranged as to be somewhat immune to quick changes in automatic gain control potential tending to occur due to increased signal strength but is quick to respond to noise effects corresponding to reductions in signal strength. Since "white noise" (that is noise tending to reduce the average carrier level during the blanking period), is rarely encountered due to the complexity of the requisite noise-signal conditions, this action, which is the reverse of commonly encountered A. G. C. systems, does add greatly to its performance. Apparatus embodying the present invention may also incorporate a protection against control grid blocking of the receiver as a result of rapid rises in signal strength, in that a limit is automatically established as to the maximum A. G. C. voltage produceable by the circuit.

It is therefore one purpose of the present invention to provide an improved automatic gain control circuit for a television receiver wherein the circuit is rendered unresponsive to received signals during the intervals between successive blanking signal periods.

It is another purpose of the present invention to provide a new and improved automatic gain control circuit in which the reference base for the development of automatic gain control potential is that of the television signal carrier strength during transmission of the black level signal.

Another purpose of the present invention resides in the provision of an improved automatic gain control circuit for embodiment in radio receivers adapted to translate television type signals wherein the circuit is rendered immune to noise for approximately 95 percent of the transmitted signal duration.

Still another object of the present invention resides in the provision of a novel automatic gain control circuit suitable for incorporation in television receiving circuits in which automatic gain control potential alteration due to increase in signal strength is markedly slow in action whereas changes in the produced control voltage due to a decrease of the received signal carrier is markedly fast.

Another object of the present invention resides in the provision of a novel automatic gain control circuit for a television receiver wherein potentials of the order adequate to block transmission of video signals through said receiver are prevented from development.

It is another purpose of the present invention to provide a simple and economical system of automatic gain control operation which requires a minimum of apparatus and yet successfully achieves all of the previous objects set forth hereinabove.

Other purposes and advantages of the present invention will be more apparent to those skilled in the art from the teaching of the following detailed description particularly when considered in connection with the related drawing in which.

In the drawings like elements are assigned like reference characters.

Figure 1:
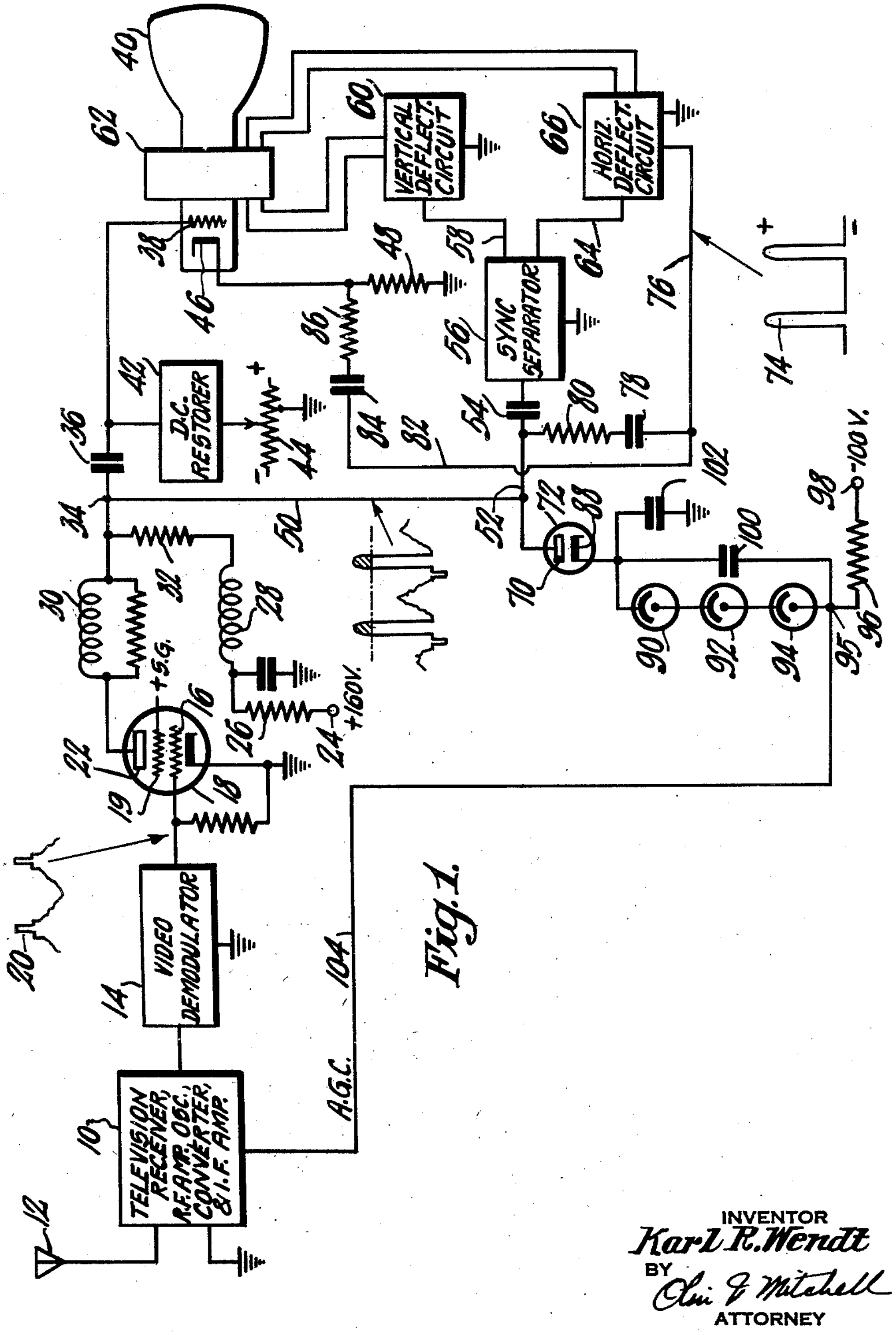
Figure 1 is a diagrammatic representation of a television receiver incorporating the present invention.

Referring now to Figure 1 there is illustrated the components of a superheterodyne televison receiver including an R. F. amplifier, oscillator, converter, and an intermediate frequency amplifier for amplifying the signal derived from the converter, these elements being indicated schematically in block form and designated by reference character 10. The radio frequency television signal is conventionally intercepted by the antenna 12 and applied to the input of the radio frequency amplifier included in block 10. The output of the intermediate frequency carrier from the I. F. amplifier, indicated in 10, is then applied to a demodulator stage 14 whose output is in turn applied to the control grid 16 of the video amplifier vacuum tube 18. The composite video signal as demodulated from the intermediate frequency carrier and applied to the control grid 16 is indicated at 20. Polarizing potential for the plate 22 of the vacuum tube 18 is supplied by positive potential source terminal 24 from a suitable D. C. voltage source (not shown) through isolating resistor 26, peaking inductance 28 and 30, and load resistor 32. The output signal of the video amplifier vacuum tube 18 is taken from terminal 34 which is indicated at the junction of resistor 32 and peaking inductance 30 of the video amplifier plate load. The screen grid 19 of the vacuum tube 18 is conventionally connected to some positive source of screen grid voltage (not shown) as is indicated by $+s. g.$ From terminal 34 on which appears the demodulated composite video signal is connected coupling capacitor 36, which applies the video signal to the control grid 38 of the kinescope 40. Since a coupling capacitor 36 is employed, the D. C. reference level of the video signal is necessarily lost, and, consequently, means are provided for reinserting the D. C. component as indicated by block 42. A simple form of brightness control is also indicated by potentiometer 44, which, according to well-known practice, provides means for applying a variable bias for the control grid 38 and thereby serves as an effective brightness control. The cathode 46 of the kinescope 40 is shown connected with ground potential through cathode resistor 48.

The composite video signal appearing at terminal 34, by means of circuit paths 50 and 52 and coupling capacitor 54 is applied to the input of the synchronizing signal separator 56. In a conventional manner the vertical output of the synchronizing signal separator is applied through circuit path 58 to the vertical deflection circuits 60 which generate the necessary deflection signal for the vertical deflection winding of the deflection yoke 62 associated with the kinescope 40. Correspondingly the horizontal timing information or "sync" derived from the synchronizing separator 56 is conducted through circuit path 64 to the horizontal deflection circuit 66 which in turn excites the horizontal deflection winding of the deflection yoke 62 with an appropriate deflection signal. The arrangement of the receiver thus far described is representative of typical television receiving systems and more detailed description of its operation is not deemed necessary for clear comprehension of the applicant's invention. The novelty, however, of the present invention does lie in the combination and operation of the circuit elements now about to be described.

From the terminal 34 from which is available the composite video signal produced by the vacuum tube 18, circuit path 50 not only applies the video signal to the synchronizing separator 56 but also applies to the anode 70 of A. G. C. diode 72. Also applied to the anode 70 are a series of pulses 74 derived from an appropriate section of the horizontal deflection circuit 66 and are applied to the anode through circuit path 76, coupling capacitor 78 and isolating resistor 80. It will be noticed that the pulses derived from the horizontal deflection circuit are also applied to the cathode resistor 48 of the kinescope 40 through circuit path 76 and 82 and thence through coupling capacitor 84 and isolating resistor 86. The purpose of this latter connection will appear as the specification proceeds. Intercalated in the load circuit of the diode 72 and connected with the cathode 88 thereof is a series of glow discharge tubes 90, 92, and 94 of the regulator or constant voltage type, the lower end of said series glow tubes being brought through load resistor 96 to a negative potential 98, having magnitude which for ease in description of the present embodiment, will be assigned a value of −100 volts. There is then connected across the series of glow tubes 90, 92, and 94, a bypass capacitor 100. This capacity effectively reduces the A. C. impedance of the series glow lamps presented to the diode load circuit as shown on A. G. C. storage capacitor such as 102 is connected between the cathode 88 of the vacuum tube 72 and ground potential. During operation of the receiver, an automatic gain control voltage is produced across condenser 102 at the diode cathode 88, and applied through circuit path 104 to the appropriate amplifier grid circuits associated with the receiver elements indicated by block 10.

Considering now, the operation of the present invention, the keying pulses 74 obtained from the properly synchronized horizontal deflection circuit 66 are of course in synchronism with the video signal horizontal synchronizing pulses and may be timed to occur during the "back porch" interval of the received combination horizontal blank-out and horizontal synchronizing signal. This relation is more clearly illustrated in Figure 2*a*, wherein the received demodulated video signal 20 produced in the output circuit of vacuum tube 18 is drawn properly orientated in respect to time with the horizontal keying pulses 74 (Figure 2*b*). The time interval $t_1$—$t_2$ indicated on the video signal 20 defines that portion of the video signal commonly referred to as the "back porch" and during which the keying pulses 74 are shown to occur.

Figure 2:
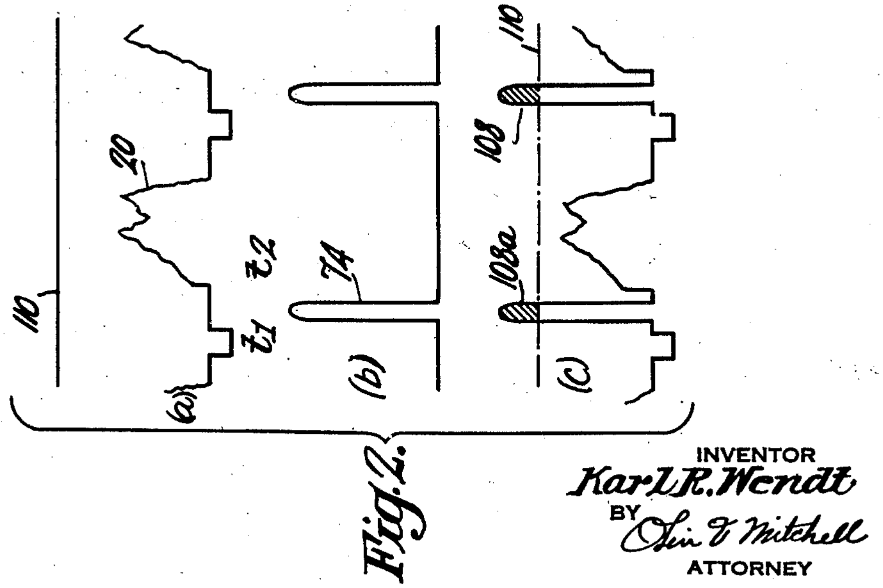
Figure 2 illustrates the synthesis of a waveform resulting from the practice of the present invention and peculiar thereto.

Referring to Figure 1 again, it has been described that the video signal appearing in the output of vacuum 18 is applied to the anode 70 of the vacuum tube 72 through circuit path 50 and that the keying pulses 74 are also applied thereto. Since the keying pulses 74 extend in a positive direction and the horizontal synchronizing and black level information of the video signal are applied to the diode in a negative direction, the composite waveform or signal appearing across the diode plate 70 and ground will be substantially of the form shown at 108. Figure 2c illustrates more clearly how the keying pulses 74 (Figure 2b) tend to lift a portion of the video signal 103 "back porch" (Figure 2a) to a more positive instantaneous voltage. For convenience in illustrating the automatic gain control action derived from this complex waveform 108, a zero or white axis 110 is indicated in Figure 1 and Figure 2. This axis 110 represents the potential level with respect to ground of the diode anode 70, under the conditions obtaining with the reception of an absolute white signal, which in turn is virtually equivalent to almost zero instantaneous received carrier energy. This reference level 110, of course, manifests significance in this respect only if the second detector D. C. and D. C. component of the video signal has been maintained up to the plate circuit of the vacuum tube 18 by either a D. C. connection between the video demodulator load circuit and the video amplifier control grid 18, or some other suitable method of establishing an accurate zero signal D. C. reference level at the diode plate 70. When such a zero level has been defined, it is necessary in the practice of applicant's invention that the amplitude of the keying pulse 74 be of such value that under the conditions of maximum received signal carrier, representing the maximum negative displacement of the synchronizing signal and black level from the D. C. axis 110, that the keying pulse will be sufficient to extend above the zero axis to cause the diode plate 70 to go substantially positive with respect to this axis. It is seen under this condition that should the carrier strength decrease, the effective height in a positive direction of the keying pulse above the zero axis will increase and therefore increase a total area indicated at 108*a* in Figure 2*c* of the keying pulse above the zero D. C. level of 110.

Before considering further the significance of this keying pulse area 108*a* it is expedient to note that the arrangement of diode 72 and its associated load circuit represents a typical form of peak voltage detector. The glow tubes 90, 92, and 94 located in the cathode circuit of the diode 72, under operation of the receiver, act as a constant potential source which merely transforms the D. C. level of the cathode 88 and any voltage variation thereof to a lower D. C. voltage level available at the upper end of resistor 96 (terminal 95) having a similar magnitude of D. C. voltage variation. Thus, the series glow tubes merely operate as a direct current voltage reducing device. The action of glow tubes 90, 92, and 94 in connection with condensers 100 and 102 to provide this voltage reducing system is easily seen from considering initial circuit conditions upon application of operating potentials to the various elements shown in this circuit diagram. Since the plate 22 of vacuum tube 18 is established at a positive potential by merit of its connection through its plate load to positive potential source 24 having magnitude of approximately 160 volts, the plate 70 of diode 72 will assume some positive potential in the order of +150 volts. In that the cathode 88 of the diode 72 is connected with −100 volts, there will necessarily be a current flow through the diode 72. The glow tubes 90, 92, and 94 may be of the commercial 991 series, each sustaining upon ionization a stabilized voltage of approximately 60 volts, although other varieties may be employed with satisfactory results. Since the potential difference between the anode 70 and the lower end of the glow tube series reaches an initial maximum of about 250 volts, it is seen that the glow tube will ignite and cause a stabilized voltage between cathode 88 and terminal 95 of 180 volts to appear. Thus, condenser 100 will charge to 180 volts and the capacitor 102 will charge to a corresponding value of approximately 175 volts. Now under the influence of a received television signal, the D. C. level of the anode 70 will necessarily become more negative due to the increased average plate current flow through the plate load of the vacuum tube 18, which in turn results from the increased second detector D. C. influence on control grid 18. Hence, conditions for conduction through diode 72 will then be destroyed and the energy stored in condensers 100 and 102 will then tend to discharge to maintain ignition of the glow tubes 90, 92, and 94. The voltage values, referred to herein, are assumed solely for illustrative purposes.

If, however, keying pulses 74 are properly established in magnitude diode conduction will be re-established whenever a keying pulse causes the plate 70 of the diode 72 to swing sufficiently positive thereby adding energy represented by area 108*a* (Figure 2*c*) to the peak detector system provided by diode and its associated load including condenser 102. Consequently the voltage to ground available at terminal 95 of the peak detector load circuit, will always be a function of the average current through the diode circuit ultimately produced therethrough by the recurrent pulses of energy provided by the area 108*a* extending above the zero axis 110. If the video signal level increases, the amount of energy imparted to the load circuit and consequently the diode current, will necessarily decrease due to the lowering of the keying pulses above the zero axis and hence, the voltage available at terminal 95 will become more negative thereby tending to decrease the gain of the receiver so as to compensate for the increase in amplitude of the received signal. On the other hand should the amplitude of the video signal at the output of vacuum tube 18 decrease, due to a reduction in signal strength applied to the television receiver, then the tip of the keying pulse 74 will extend further above the zero axis 110 in a positive direction such as to increase the area 108*a* and produce increased A. G. C. diode current. Accordingly this increase in diode current will cause the terminal 95 to become more positive with respect to ground and effect a compensatory increase in gain of the television receiver as hereinbefore described.

A particular feature of the present invention, resides, in the inverse action with which the automatic gain control voltage is developed by means of this system. Whereas in conventional A. G. C. systems an increase in carrier provides an increase in A. G. C. detector current, the present arrangement produces a decrease in R. G. C. detector current for an increase in carrier signal amplitude. The capacitors 100 and 102 in conjunction with diode load resistance 96 form an RC delay network preferably adjusted to have a time constant in excess of two or three horizontal line intervals. Since the conduction impedance of the diode 70 is relatively low compared to the resistor 96, it is apparent that capacitor 102 will increase its terminal voltage more rapidly when energy is added thereto by conduction of vacuum tube 70 than it will suffer a reduction in terminal voltage during nonconduction of diode 70 with its consequent discharge through the diode load resistance 96. Consequently, a decrease in received signal strength produces a very rapid correction voltage which properly increases the gain of the receiver sensitivity whereas an increase in average signal strength (occurring as the result of the most common type of noise interference) allows a relatively slow A. G. C. correction dependent upon the diode load circuit time constant herebefore mentioned. Thus, the noise immunity of this A. G. C. system is greatly enhanced over that of unkeyed systems due to its resultant 95 percent idle time and is improved over existing keyed systems due to the immunity obtained by this inverse A. G. C. detector action.

Inasmuch as the keying pulse 74 is applied to the anode of the diode 70 (in Figure 1), it is evident that the keying pulse 74 will also appear as a white pulse on the grid 38 of the kinescope 40. This however, offers no particular disadvantage in that it is quite simple to apply a cancelling pulse in the cathode of the kinescope which is in phase with the white keying pulse as applied to the kinescope grid. This is accomplished by simply applying the same keying pulse employed for A. G. C. action to an impedance such as 48 in series with the kinescope cathode circuit, and is accomplished through circuit path 82 from the horizontal deflection circuit 66 which applies the pulses 74 through condenser 84 and resistor 86 to the cathode impedance 48.

Figure 3:
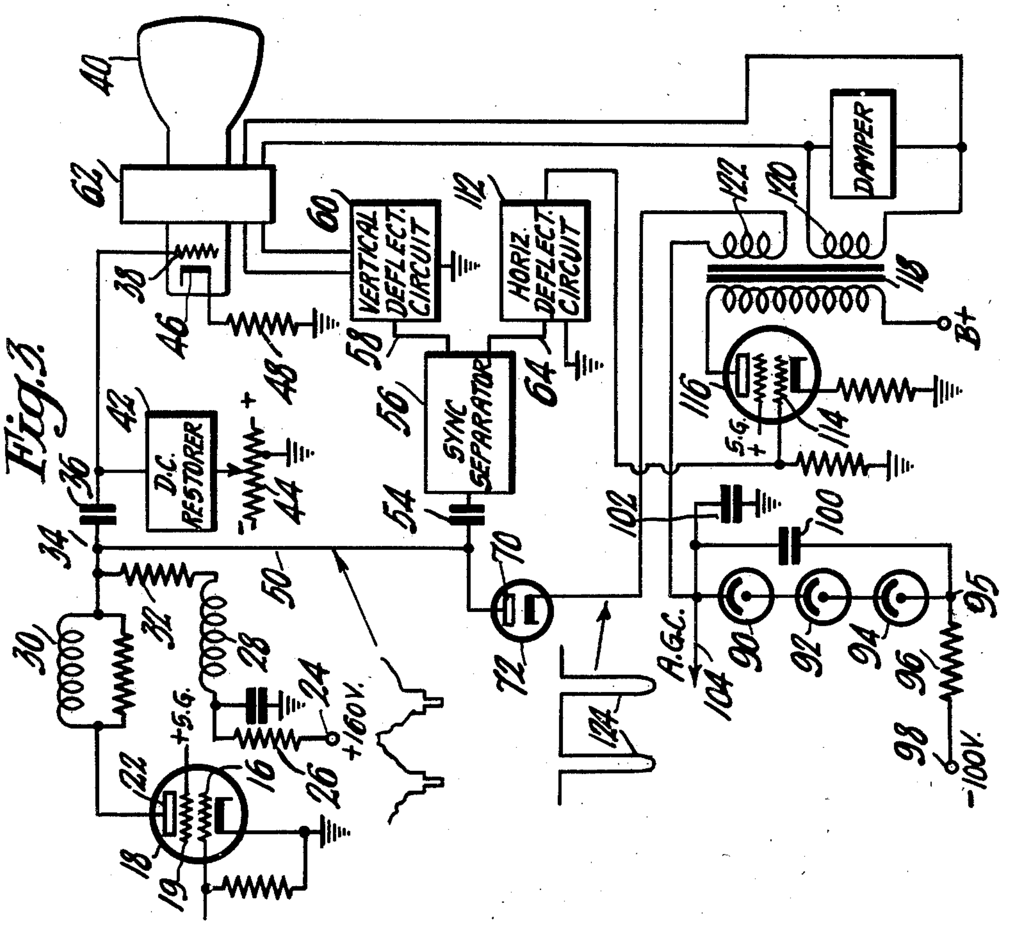
Figure 3 shows another embodiment of the present invention in a television receiver of the type substantially as shown in Figure 1.

In instances where a relatively low impedance source of keying pulses are available, it is possible to effect simplification of the embodiment shown in Figure 1 such that application of a correcting white pulse to the kinescope cathode circuit is not necessary. Such an arrangement in accordance with the invention is shown in Figure 3 which employs substantially the same elements as shown in Figure 1 except omitting those associated with the white pulse correcting network.

As in Figure 1 vacuum tube 18 through circuit path 50 supplies the video signal to the anode 70 of the diode 72 and the kinescope control grid 38 is excited from the vacuum tube 18 through coupling condenser 36. The synchronizing separator 56 also derives its synchronizing information from the vacuum tube 18 through coupling capacitor 54, the output of the synchronizing separator being conveyed through circuit paths 58 and 64 to the respective vertical and horizontal deflection circuits 60 and 112. It is noted that element 112 does not comprise the same deflection circuit as the block element 66 in Figure 1 but is shown only to indicate the horizontal drive circuit which supplies the deflection signal to a control grid such as 114 of a horizontal deflection output tube such as 116. In a conventional manner a horizontal output transformer 118 is used to transfer the deflection signal developed in the high impedance plate circuit of vacuum tube 116 to the low impedance yoke circuit 120. Often times associated with the horizontal output transformer 118 is a high voltage autotransformer impulse step-up winding in turn applied to a high voltage rectifier circuit. The latter combination supplies a unidirectional potential of several thousand volts D. C. for application to the kinescope accelerating electrode. For sake of simplicity and additional ease in illustrating circuit element pertinent to the present invention this form high voltage circuit is not shown. However a low impedance secondary winding 122 is shown as associated with the magnetic core of the output transformer 118 for the purpose of deriving keying pulses 124 which are of similar contour and identical timing to pulses 74 shown in connection with Figure 1. Their action in cooperation with diode 72 to develop a keyed A. G. C. control voltage is practically identical to the method of Figure 1. The only difference in the arrangement shown in Figure 3 is that the keying pulses 124 are applied to the diode in series with the cathode circuit by simply including the supplemental winding 122 of the output transformer 118 in the load circuit of the A. G. C. diode. The keying pulses themselves will, of course, correspond to the flyback or retrace interval of the deflection cycle. For purposes of ease of illustration, however, in both Figures 1 and 2, the pulse waveform obtained in this manner or in any other appropriate manner is idealized in that any sawtooth resistance component or undamped oscillatory ripples are not represented. This is justifiable since it is the high amplitude flyback pulses that are employed for keying purposes, other incidental low amplitude waveform peculiarities between the pulses are of minor importance. The winding 122 is so polarized with respect to the diode circuit that the cathode is swung in a negative direction with respect to ground during the keying pulse interval, thus having the same effect on diode conduction as though the anode 70 were swung in a positive direction to ground during the keying pulse interval as is the case in Figure 1. Hence, the technic of developing the A. G. C. voltage is precisely the same as hereinbefore described and the improvement in this latter embodiment obtains solely by eliminating the necessity of suffering white pulse keying information on the control grid 38 of the kinescope 40. This obviates the otherwise necessary application of a correcting pulse to the cathode 46 of the kinescope and further makes optional the use of series cathode resistance 48. It may be noted that the method of inserting the keying pulses in series with the diode cathode circuit also eliminates the loading of the horizontal deflection circuit imposed on the same by the system shown in Figure 1.

From the foregoing it is seen that the applicant has provided a simple, novel, economical, and effective form of A. G. C. control system which although particularly applicable to television receivers is amenable to adaptation in circuits other than television wherein signals are employed having recurring intervals of signal level which represent a constant percentage of the peak amplitude reached by that signal. Also the applicant's invention has provided a method allowing inverse A. G. C. control voltage action wherein an increase in control voltage is directly obtained from a decrease in signal strength thereby procuring additional noise immunity for keyed forms of automatic gain control circuits.

I claim:

In a television receiver comprising a video amplifier having an output terminal, said video amplifier output terminal being connected to a source of potential positive with respect to ground, said receiver being adapted to receive a television signal having a recurrent pulse component, an automatic gain control circuit comprising: a unilateral conduction device having an anode and a cathode, a direct current connection between the anode of said unilateral conduction device and said video amplifier output terminal to apply television signals to said unilateral conduction device with a polarity such that said recurrent pulse component tends to oppose conduction therein, a source of keying pulses occurring only during the occurrence of said recurrent pulse component, means to apply said keying pulses to said unilateral conduction device with such polarity as to tend to produce conduction therein and with such amplitude as to conditionally overcome said recurrent pulse component thereby establishing conduction in said diode, a storage capacitor connected between the cathode of said unilateral conduction device and ground, a source of potential negative with respect to ground, at least one glow tube having a first and a second electrode, a connection between the first electrode of said glow tube and the cathode of said unilateral conduction device, a resistance connected between the second electrode of said glow tube and said source of negative potential, and a connection from a point between said glow tube second electrode and said resistance to said television receiver to control the gain thereof.

KARL R. WENDT.

References Cited in the file of this patent

UNITED STATES PATENTS

| Number | Name | Date |
|---|---|---|
| 2,158,261 | Urtel et al. | May 16, 1939 |
| 2,230,295 | Holmes | Feb. 4, 1941 |
| 2,328,946 | Blumlein | Sept. 7, 1943 |
| 2,529,423 | Speilman | Nov. 7, 1950 |
| 2,547,648 | Loughren | Apr. 3, 1951 |
| 2,566,763 | Fyler | Sept. 4, 1951 |

FOREIGN PATENTS

| Number | Country | Date |
|---|---|---|
| 515,209 | Great Britain | Nov. 29, 1939 |
| 621,465 | Germany | Apr. 13, 1933 |
| 845,897 | France | Sept. 4, 1939 |
| 848,207 | France | Oct. 25, 1939 |
| 851,899 | France | Jan. 16, 1940 |
| 868,498 | France | Dec. 31, 1941 |
| 873,623 | France | July 15, 1942 |